United States Patent [19]

Iketani

[11] Patent Number: 5,392,168
[45] Date of Patent: Feb. 21, 1995

[54] METHOD OF RECORDING DIGITAL VIDEO AND AUDIO DATA

[75] Inventor: Akira Iketani, Higashiosaka, Japan

[73] Assignee: Matsushita Electric Industrial Co., Ltd., Osaka, Japan

[21] Appl. No.: 112,050

[22] Filed: Aug. 26, 1993

Related U.S. Application Data

[63] Continuation-in-part of Ser. No. 750,484, Aug. 27, 1991, abandoned.

[30] Foreign Application Priority Data

Aug. 31, 1990 [JP] Japan .................................. 2-231703
Sep. 26, 1990 [JP] Japan .................................. 2-258020

[51] Int. Cl.$^6$ .................................................. G11B 5/09
[52] U.S. Cl. ........................................ 360/40; 360/48
[58] Field of Search .................... 360/40, 51, 48, 32, 360/19.1, 49, 18, 39; 369/59, 32; 375/119, 120, 106; 358/335, 343, 261.1, 261.2, 261.3; 341/50.55, 95

[56] References Cited

U.S. PATENT DOCUMENTS

| | | | |
|---|---|---|---|
| 3,689,899 | 9/1972 | Franaszek | 341/59 |
| 3,852,687 | 12/1974 | Hodges | 341/59 |
| 4,486,739 | 12/1984 | Franaszek et al. | 341/59 |
| 4,598,326 | 7/1986 | Leiner | 360/40 |
| 4,677,421 | 6/1987 | Taniyama | 360/39 X |
| 4,688,016 | 8/1987 | Fok | 360/39 X |
| 4,719,523 | 1/1988 | Kutaragi | 360/51 |
| 5,245,483 | 9/1993 | Van Gestel | 360/40 |

FOREIGN PATENT DOCUMENTS 0420179 4/1991 European Pat. Off. .

*Primary Examiner*—Ali Neyzari
*Attorney, Agent, or Firm*—Wenderoth, Lind & Ponack

[57] ABSTRACT

A data word of 8 bits is code-transformed into a code word of 12 bits, for an 8/12 code which is suitable for high density recording such as $d=2$ and $k=10$, two kinds of synchronous pattern which never appear in data can be respectively provided for the video and audio uses while keeping the limitation with respect to d and k. Accordingly, decision error between the video data and audio data resulting from reproducing error can be significantly decreased, leading to an improvement in error probability and yet it is realizable with an extremely practical circuit structure. In addition, a pilot signal can be generated digitally with an extremely simple circuit, being suitable for home-use digital VCRs or the like which requires a stable pilot signal. As a result, the error rate of a super high density recording apparatus such as, for example, a digital VCR can be significantly decreased, and thus, its practical effects are very large.

6 Claims, 8 Drawing Sheets

METHOD OF RECORDING DIGITAL VIDEO AND AUDIO DATA

This application is a continuation-in-part of now abandoned application, Ser. No. 07/750,484, filed Aug. 27, 1991.

BACKGROUND OF THE INVENTION

1. Field of the Invention

This invention relates to a digital signal recording methods to be used suitably for high density recording of digital signals of digital video tape recorder (VCR) or the like.

2. Description of the Prior Art

Conventionally commercially available digital VCRs (hereinafter abbreviated as DVCRs) are exclusively used for broadcasting purposes, in which the recording is, performed in the block form as shown in FIG. 2. That is, the recording block consists of a synchronous pattern showing the top block thereof, an ID showing the information of a recording data and the recording data. When reproducing, the synchronous pattern is detected to identify the top block thereof, and then, the ID or data are restored.

With the conventionally commercially available DVCRs for broadcasting use, the synchronous pattern for the video data and that for the audio data are identical. The audio data and video date are added as a part of the ID block in FIG. 2 with respective special identification codes mutually identifiable for each recording block in which the data are contained and then, recorded. On the other hand, when the reproduction is to be carried out, the reproducing data is identified if it is video or audio in response to the identification code thus added thereby switching the following processings in accordance with the result therefrom.

As shown above, with the DVCR, when reproducing, the video and audio data have different processings depending on the identification codes in respective recording blocks. As a result, if the identification code is erroneous, such a case may happen in which the video data is processed as audio data and vice versa. It typically exemplifies the fact that an extremely small error results in an extremely large error, arising in a critical problem on a practical basis.

Since the conventionally commercially available DVCRs are for broadcasting use, a lot of circuit means are provided in order to prevent errors in the identification code, thereby overcoming such a problem as shown above. In this case, however, referring to DVCRs for the home use which will be commercially available in the future, large-scale circuit means cannot be packaged on a cost effective basis as a measure to prevent errors in the identification code as DVCRs for broadcasting use. Accordingly, to find a method which is comparatively easily capable of largely reducing the error generation in the identification code is a critical theme for realization of home-use DVCRs.

On the other hand, at present, in the magnetic recording field, the development of narrow tracking technology is in progress in order to improve the recording density: For example, with home-use VCRs now on sale, signals are recorded obliquely on a tape as shown in FIG. 9. The locus thus formed on the tape is called a track, the effective width of which being called a track pitch (TP).

At present, the track pitch is less than 30 μm, and it is not an impediment if the track is handled substantially linearly due to the fact that the track may be curved resulting from a lack of accuracy in the mechanical system and a reduced amount of the actual track pitch ranges from 2 to 3 μm. This means that the effect of the track curvature can be ignored.

However, in case of setting the track pitch to be less than 10 μm, for example, to be 5 μm in order to improve the recording density, a problem such as that shown in FIG. 10 will arise. Namely, a track curvature as mentioned above narrows the effective track width up to about half of the actual widths. A reduction of the track pitch causes the signal power to be lowered and the reliability of the signal to be decreased, so that when the effective track width is only half of the actual track pitch, the reliability of the signal will be significantly decreased.

For the reasons as shown above, in case of narrow track recording, a function to control the height of a head so as to follow the head to the track curvature is additionally provided. This function extracts a special frequency (hereinafter called a pilot frequency) for tracking which is recorded on the track superposed on the signal from the reproducing signal by providing the head to the top end of a piezoelectric element and controls the voltage to be applied to the piezoelectric element in response to the level of the pilot signal thus extracted. As a result, the head can accurately trace the track curvature, so that the effective track width can be substantially equal to the actual track pitch.

However, in case of superposing a pilot signal on a signal, it is conventionally recorded in an analog fashion so as to be superposed upon the signal. In this case, the pilot signal is equivalent to noise from the stand point of the signal. As a result, if the recording level of the pilot signal is made excessively large in order to make sure of accurately extracting the pilot signal, a lot of noise is recorded so as to be superposed upon the signal, resulting in an increase in error.

On the other hand, if the recording level thereof is excessively small, the pilot signal cannot be extracted correctly. In addition, even if a suitable recording level of the pilot signal exists, it will be varied depending on the VCR deck to be used for recording. Accordingly, there arises a problem in that the deck must unavoidably require a lot of time for adjustment during the manufacturing thereof.

SUMMARY OF THE INVENTION

An object of this invention is to provide a new method of solving the problems which have arisen in the prior art as shown above. Namely, when a synchronous pattern is to be inserted into a recording block consisting of a plurality of information signals as a top pattern, the synchronous pattern is selected according to the kind of the plural information signals, so that a digital signal recording apparatus capable of correctly identifying the kind of the reproduced information signal can be provided.

For example, a digital signal recording method of this invention uses different synchronous patterns for the video and audio data, respectively. In this case, the identification of the two kinds of synchronous patterns and the identification code being conventionally used are employed in combination, so that the discrimination between the video data and audio data can be correctly performed. Also, using the fact that the synchronous pattern has a larger bit number than the identification code in general and such a probability that the synchronous pattern for the audio data is erroneously identified as the synchronous pattern for the video data is extremely small, the video data and audio data can be correctly identified only by discrimination between these two synchronous patterns.

Thus, this invention makes possible that by selecting the synchronous pattern according to the kind of data, the discrimination therebetween can be achieved with a far smaller error than would be obtained when using only the identification code for discriminating the kind of data simply as in the prior art.

Another object of this invention is to provide a novel digital signal recording method which is capable of completely eliminating the disadvantages caused by the conventional analog pilot signal, and in which the digital recording sequence itself generates a large level of spectrum only at the pilot frequency. Such a recording sequence can be obtained by inserting the binary value 1 continuously for one bit or more and the binary value 0 continuously for one bit ore more alternately at a predetermined interval into an original recording sequence.

That is, 1s and 0s are inserted alternately and periodically into the original recording sequence. As a result, the newly obtained recording sequence has 1s and 0s appearing alternately and periodically. Such an alternate appearance of 1s and 0s generates a sharp spectrum at the frequency of the inverse number of this period. Accordingly, the desired pilot signal can be obtained by setting the predetermined interval suitably. In addition, the bit rate of the pilot frequency is selected such as to be about 1/50 of the recording bit rate in many cases, and the insertion of 1s and 0s is as small as 1 bit per 50 bits of the original recording sequence, so that the bit rate of the newly obtained recording sequence can be increased by only several percentages higher than that of the original recording sequence, thus being almost no problem on a practical basis.

Further in addition, since the bit pattern showing such frequency spectrum is inserted simply between the recording sequence, this insertion does not give any disturbance to the recording sequence and the pilot level is extremely stable, which means that the problems arisen with the conventional analog pilot signal are completely solved by this invention.

DESCRIPTION OF PREFERRED EMBODIMENTS

Embodiment 1

In Embodiment 1, an 8/12 code which is suitable for high density recording will be explained below as an example. The 8/12 code is a code such that the data word of 8 bits is transformed into a code word of 12 bits and the continuous bit number of the same binary value obtained by connecting the code words of 12 bits thus transformed adjacently to each other according to a specific rule is limited to the minimum 2 ($=d$) and the maximum 10 ($=k$).

Figure 3:
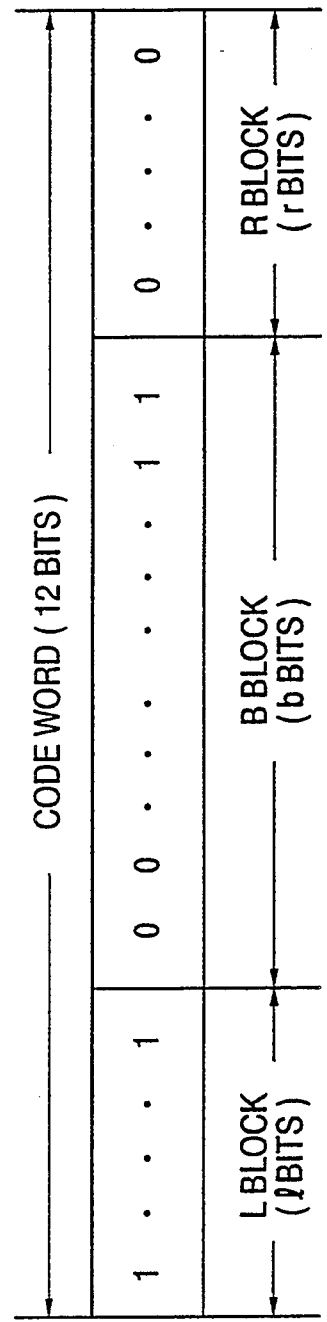
FIG. 3 is a structural diagram of a code word.

A detailed explanation follows on the 8/12 code. In this case, however, for the convenience of explanation, in order to classify the code words to be used in the 8/12 code, the parameters representing the features of a code word as shown in FIG. 3 are defined as follows;

L block: Start block of a code word of 1 bit having the same binary value TB Continued.

R block: End block of a code word of r bits having the same binary value LB continued.

B block: Intermediate block of a code word of b ($=12$-$l$-$r$) bits

The code words to be used for the 8/12 code are limited to those satisfying the following conditions;

$$1 \leq l \leq 9, 1 \leq r \leq 9 \qquad (I)$$

In (I) B block, the limitations to d and k are completely satisfied.

Figure 4:
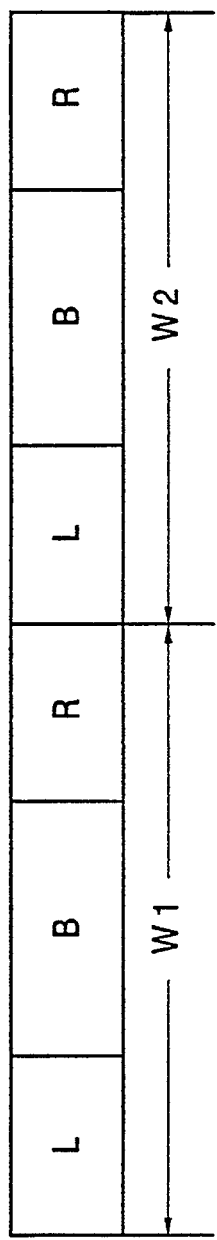
FIG. 4 is a diagram for explaining the mutual connection of code words.

The symbol (I) means that in the B block, 0 and 1 are alternately continued ranging in bit from 2 to 10 (excepting 0). In addition, the following parameters F and E are introduced in connection with l and r, respectively;

$F = 0 (l = 1)$
$F = 1 (2 \leq l \leq 5)$
$F = 2 (6 \leq l \leq 9)$
$E = 0 (r = 1)$
$E = 1 (2 \leq r \leq 5)$
$E = 2 (6 \leq r \leq 9)$ Based on the four parameters (TB, F, E and LB) thus defined, the code words are mutually controlled, which means that referring to the connection of the first code word W1 and the second code word W2 shown in FIG. 4, the limitations to the minimum d and maximum k are to be satisfied even at the connection part of the R block of the code word W1 and the L block of the code word W2. Hereinafter, the rule relate to the mutual connection of code words is called connection rule.

Table 1 shows a combinational rule of code words in this embodiment, which is defined based on the four parameters (TB, F, E and LB). In Table 1, No. indicates a combination number of code words and an identification number of the code words to be combined, and to the code words making one combination which correspond to the same data word.

In Table 1, TB, F, E and LB are parameters of a code word. A code word represented by these parameters will be exemplified. Then, the combination rule of code words in Table 1 will be explained in detail. In this case, the code word obtained by replacing 1 and 0 in the code word A respectively with 0 and 1 is called inverse pattern of the code word A and expressed as A'.

(1) The code word CW (F, E, 1) of $F \neq 1$, $E \neq 1$, $TB = 1$ and $LB = 1$ is combined with the code word CW (F, E, 1)′ as its inverse pattern and the code word CW (F, E, 0) which is equal in F, E and TB to the code word CW (F, E, 1) and LB=0 is combined with the code word CW (F, E, 0)′ as its inverse pattern.
(No.=1, 4, 13)

(2) The code word CW (F, 1, X) of F≠1, E=1, TB=1 is combined with the code word CW (F, 1, X)′ as its inverse pattern. In this case, however, X indicates either 0 or 1.
(NO.=2, 3, 14, 15)

(3) The code word CW (1, E, 1) of F=1, E≠1, TB=1 and LB=1 is combined with the code word CW (1, E, 0) which is equal in F, E and TB to the code word CW (1, E, 1) and LB=0.
(No.=5, 6, 11, 12)

(4) The code word CW (1 , 1, X ) of F=1 and E=1 is not combined with the code word CW (1, 1, X)′ but corresponded to the data word independently.
(No.=7, 8, 9, 10)

When the code word are mutually combined through the combination rules (1) to (4) as shown above, as shown in Table 2, the limitation to d and k can be surely satisfied. Among the code words of 12 bits, the number of the combinations of code words obtained resulting from performing the combinations according to the paragraphs (1) to (4) only for the code words satisfying the conditions shown in the parentheses is 264 as shown in FIG. 3. In addition, DP shown in Tables 3.1–3.7 indicates the absolute value of the difference between the number of 1 and that of 0 in a code word (called disparity).

From the fact that the number of data words of 8 bits is 256, RLL code of 12 bits satisfying the limitations such as d=2 and k=10 of this invention can completely code-transform the data word of 8 bits. In a general digital recording, a synchronous pattern is added in order to perform the block synchronization by block with a plurality of data as one block. As the synchronous pattern in this case, it is preferable to select a special pattern which never appears in general data in order to correctly detect the synchronous pattern.

Figure 5:
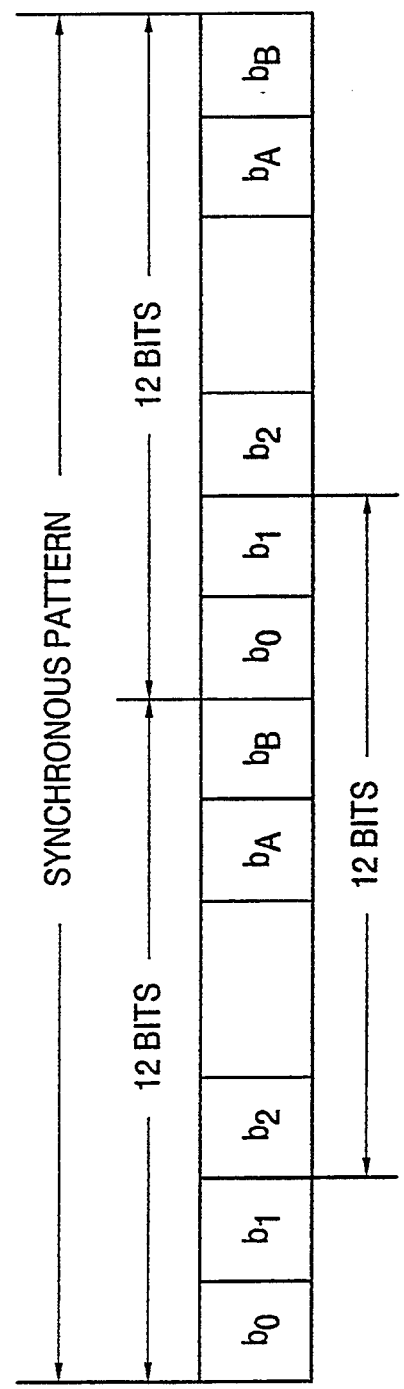
FIG. 5 is a structural diagram of a synchronous pattern.

In Embodiment 1, the code word which corresponds to the data word is limited to the code words (265 words) with a DP value below 6 in Tables 3.1 to 3.6 and the synchronous pattern to be used is that the same code words (F=1, E=1) with a DP value of 8 are arranged in a 2-word series manner (for example, code word No. 256 in Table 3.7). As shown in FIG. 5, the bit (bi; i=1-B) constituting a code word with a DP value of 8 is surely contained even in any of continuous 12 continuously bits (B12) of a synchronous pattern of 24 bits, so that the DP value of the B12 becomes 8. On the other hand, the code word of 12 bits of at least one word is contained in the bit string of 24 bits. As a result, in case of the bit string obtained by mutually connecting the code words with a DP value below 6 corresponding to the data word, 24 optionally continuous bits surely contain, as a part thereof, the 12 continuous bits with a DP value below 6. Therefore, this synchronous pattern never appears in the bit string obtained by mutually connecting the code words corresponding to the data word.

As shown above, by defining the code word corresponding to the data word and the data word to be used as the synchronous pattern, correct block synchronization can be provided while keeping the limitations of d=2 and k=10. Similarly, as the synchronous pattern, a pattern such that the code words (F=1, E=1) with a DP value of −8 are arranged in a 2-word series manner is used (for example, code word No. 257 in Table 3.7). That is, the 8/12 code has at least two words as a pattern suitable for the synchronous pattern which never appears in the data.

Here, as the synchronous pattern, the following two kinds are selected;
For video use: 111111001111111110011111
For audio use: 000001100000000001100000

The two synchronous patterns are in complementary in relation to each other, so that in order to completely misidentify the synchronous patterns for video and audio use, it is necessary for 24 bits to be erroneous. However, the bit error rate under the normal reproducing state is as small as $1 \times 10^{-4}$ or less, and at most $1 \times 10^{-3}$ or less, which means that such a probability that the synchronous patterns of two kinds are entirely erroneous can be ignored.

Figure 1:
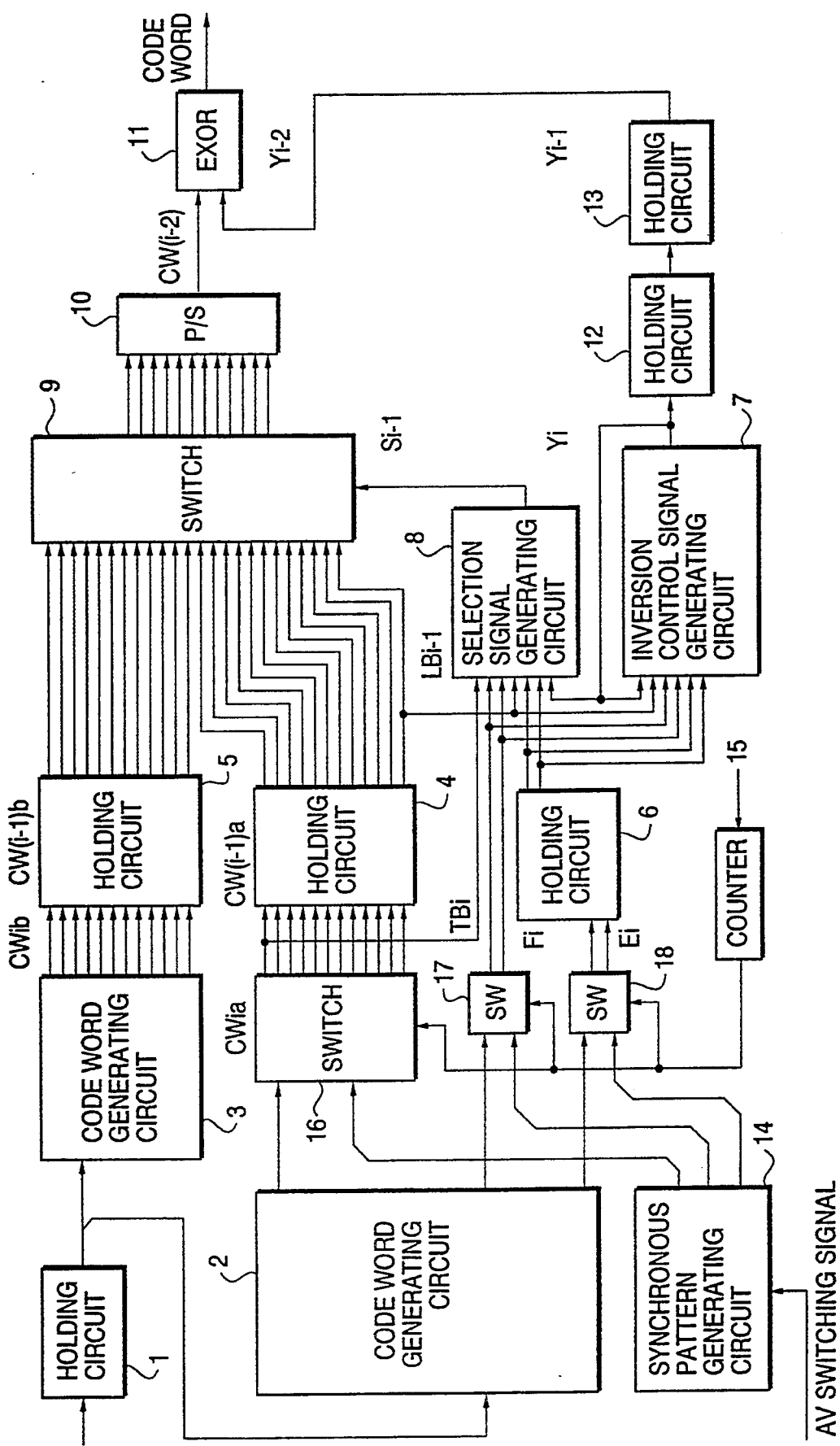
FIG. 1 is a block diagram of a code transform apparatus according to a first embodiment of this invention.
Figure 2:
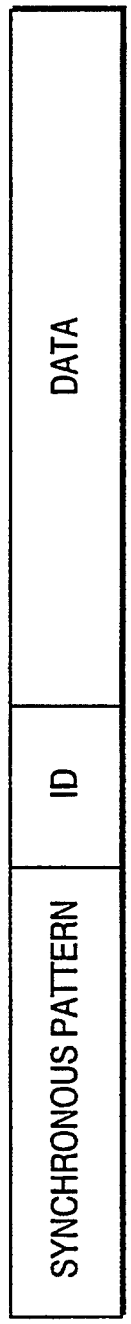
FIG. 2 is an explanatory diagram of a recording block.

Next, the operation of the code transforming apparatus of Embodiment 1 will be explained below by referring to FIG. 1. In FIG. 1, a holding circuit 1 successively holds the data words of 8 bits which are periodically supplied. The output from the holding circuit 1 is delivered to a code word generating circuit 2 and a code word generating circuit 3. In the code word generating circuit 2, the "code word" of E=1 and the "code word 1" of E≠1 in Tables 3.1-3.7, and the parameters F and E of the L and R blocks of these code word are generated.

In this case, the code word appeared in the output of the code word generating circuit 2 is expressed as $CW_{ia}$. On the other hand, in the code word generating circuit 3, the "code word 2" of E≠1 in Tables 3.1-3.7 is generated. In this case, the code word appeared in the output of the code word generating circuit 3 is expressed as $CW_{ib}$. In addition, No. in Tables 3.1-3.7 corresponds to the data word appeared in the output of the holding circuit 1. For example, if the value of the data word is 154, the code word 100011100111 of No. 154 in Tables 3.1-3.7 appears in the code word generating circuit 2.

A holding circuit 4 holds the output of the code word generating circuit 2, a holding circuit 5 holds the output of the code word generating circuit 3, and a holding circuit 6 holds the values of the parameters E and LB for the R block of the just before code word $CW_{(i-1)a}$. Also, the value of LB may be a value of the final bit of the code word $CW_{(i-1)a}$. In addition, an inversion control signal generating circuit 7 generates a value Y to control the code word $CW_{ia}$ to make it of the inverse pattern or not (Y=1; inverse pattern) in accordances with Table 2.

in this case, the values of TB, F, LB and E for the code word $CW_{ia}$ are expressed as $TB_i$, $F_i$, $LB_i$, and $E_i$, respectively. Also, the values of TB, F, LB and E of the just before code word $CW_{(i-1)a}$ are expressed as $TB_{i-1}$, $F_{i-1}$, $LB_{i-1}$ and $E_{i-1}$, respectively. Thus, if the inversion information for the just before code word $CW_{(i-1)a}$ is expressed as $Y_{i-1}$ the inversion information $Y_i$ for the code word $CW_{ia}$ becomes 1 when it satisfied any of the following three conditions;

$LBX_{i-1}=0, F_i=0$  (Y.1)

$LBX_{i-1}=0, E_i=0$ and $F_i=2$  (Y.2)

$LBX_{i-1}=1, E_{i-1}\neq 0$ and $F_i=2$,  (Y.3)

where $LBX_{i-1}$ can be obtained by the exclusive OR $LB_{i-1}c$ and $Y_{i-1}$.

On the other hand, a selection signal generating circuit 8 generates selection signal S. A switch 9 is switched in response to the selection signal S so as to thereby select either the code word from the code word generating circuit 2 or that from the code word generating circuit 3. The selection signal S becomes 1 only when any one of the following two conditions is satisfied, and only in this case, the code word from the code word generating circuit 3 is selected.

$$E_{i-1}=0, LBX_{i-1} \neq TB_i, \text{ and } F_i=1 \quad (S.1)$$

$$E_{i-1}=2, LBX_{i-1}=TB_i, \text{ and } F_i=1 \quad (S.2)$$

As seen from the conditions (Y.1) to (Y.3) and (S.1) and (S.2), the inversion control signal generating circuit 7 and the selection signal generating circuit 8 each can be realized by using a simple logic circuit. Next, a parallel/serial converter 10 converts the code word of 12-bit paralleled appeared in the output of the switch 9 into a serial data. An EXOR gate 11 inverts the serial code word response to the output of the parallel/serial converter 10 and the inversion control signal Y from the inversion control signal generating circuit 7 to output, or does not invert it but directly outputs it.

Holding circuits 12 and 13 serve as a time-control between the code word output form the parallel/serial converter 10 and the inversion control signal output for this code word. On one hand, in the video block, a synchronous pattern generating circuit 14 generates a two-word (24 bits) synchronous pattern of 111110011111111110011111 and the parameters of F=1 and E=1 corresponding to this synchronous pattern in response to the AV switching signal. On the other hand, in the audio block, it generates a two-word (24 bits) synchronous pattern 000001100000000001100000 and the parameters of F=1 and E=1 corresponding to this synchronous pattern.

Of these signals thus generated, in response to the synchronous pattern block signal from a counter 15, the synchronous pattern is sent to a switch 16, the parameter of F=1 is sent to a switch 17 and the parameter of E=1 is sent to a switch 18. The switches 16, 17 and 18 each selects and outputs the corresponding signal from the synchronous pattern generating circuit 14 only while the synchronous pattern block signal from the counter 15 is being ON. As a result, the synchronous patterns are processed entirely similarly to the code word of F=1 and E=1, which means that the inversion of the synchronous pattern and/or the infringement of the limitation rule to d and k before and after the synchronous pattern does not occur.

As shown above, with the circuit structure as shown in FIG. 1, the data word of 8 bits is transformed into a code word of 12 bits. In the 8/12 code in which the continuous bit number of the same binary values in the bit string obtained by mutually connecting the transformed code words of 12 bits is limited as to range from 2 to 10, two kinds of synchronous pattern which are never appeared in the data can be generated for the video and audio uses.

Figure 6:
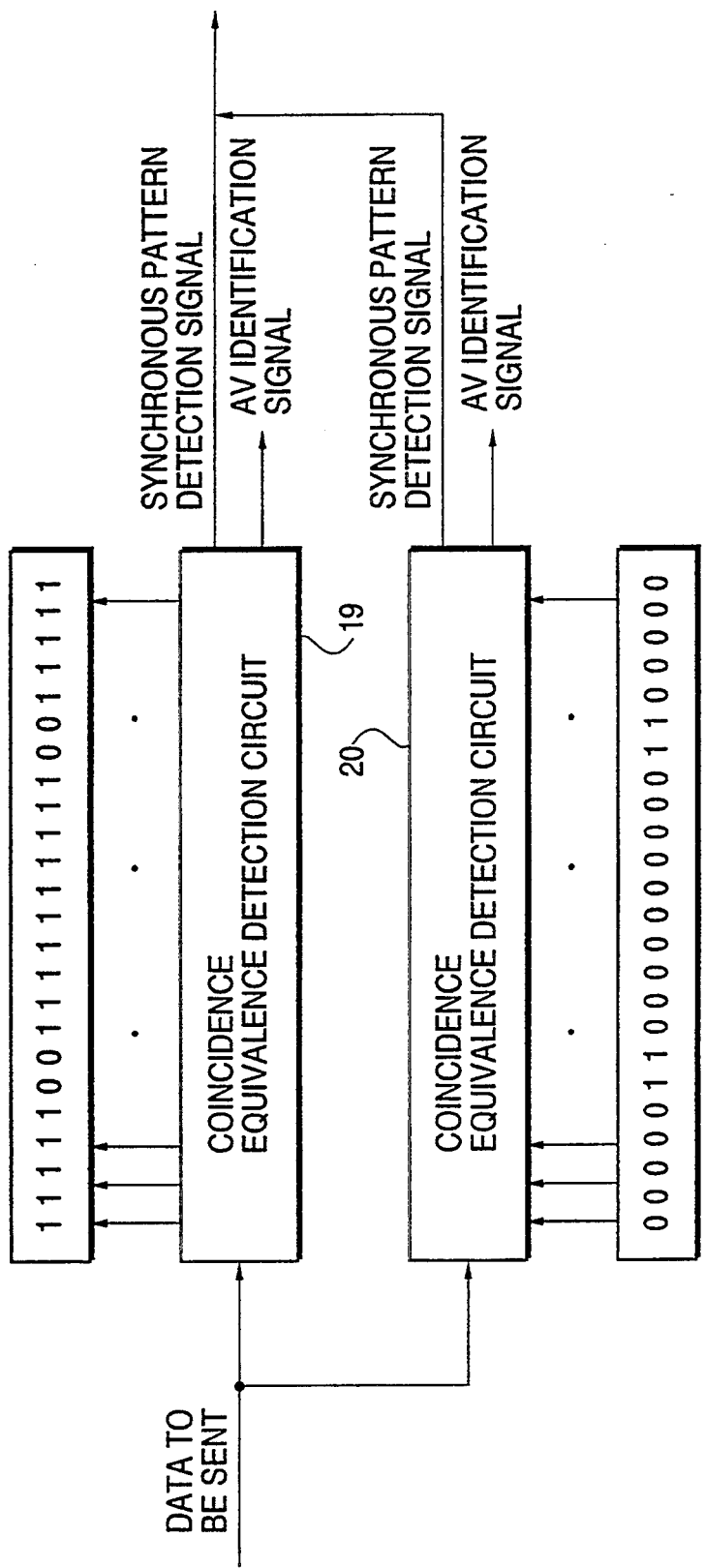
FIG. 6 is a circuit diagram of a synchronous detection circuit.

On the other hand, the identification of the synchronous pattern for the video or audio use can be easily realized by using two kinds of coincidence circuits as shown in FIG. 6. That is, the two coincidence circuits are a coincidence detection circuit 19 for detecting the coincidence of the inputted data with the synchronous pattern 111110011111111110011111 for video use and a coincidence detection circuit 20 for detecting the coincidence of the inputted data with the synchronous pattern 000001100000000001100000 for audio use.

The coincidence detection circuit 19 generates an AV identification signal (=0) showing that the coincidence signal is coincident with the synchronous pattern for the video use and the coincidence detection circuit 20 generates an AV identification signal (=1) showing that it is coincident with the synchronous pattern for audio use. As a result, the synchronous pattern detection signal and the AV identification signal can be simultaneously obtained. Thereafter, for example, by using in combination with a conventional identification code, the identification error probability to be occurred between the video and audio blocks can be further reduced.

Figure 7:
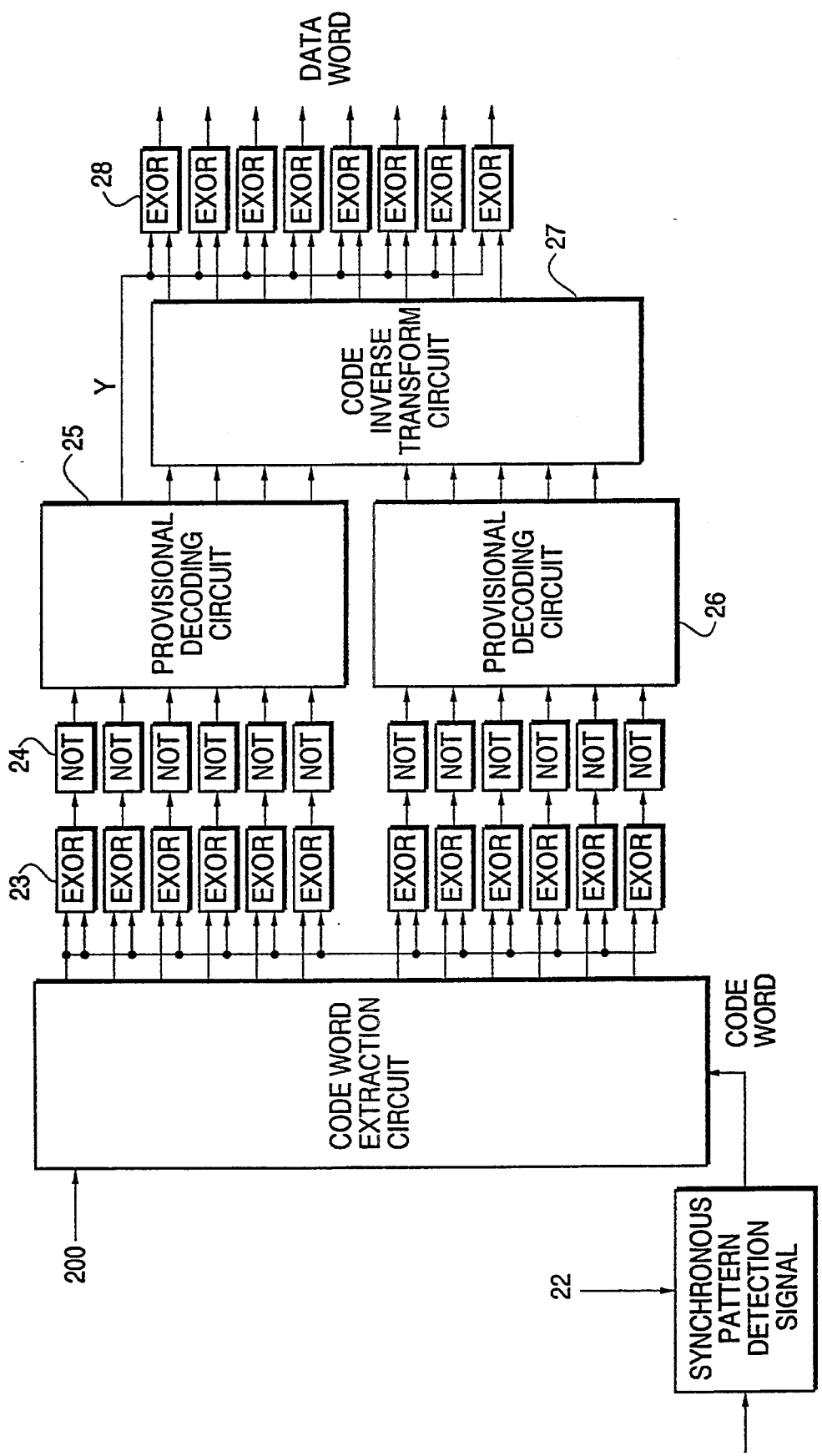
FIG. 7 is a block diagram of a decoding circuit.

Next, the decoding circuit for decoding the data word of 8 bits from the code word of 12 bits in response to the synchronous pattern detection signal detected as shown in FIG. 6 will be explained below. In FIG. 7, a code word extraction signal generating circuit 22 generates a signal showing the word boundary of code words from the reproduced bit string in response to the synchronous pattern detection signal. A code word extraction circuit 200 extracts a code word of 12 bits from the reproduced bit string in response to the output form the code word extraction signal generating circuit 22.

Then, the code word of 12 bits is decoded into a data word of 8 bits. With the conventional decoding method, a code word of 12 bits is decoded directly into a data word of 8 bits. If it is performed using a ROM (Read Only Memory), the necessary capacity for the ROM is $2^{12} \times 8 = 32$ kilo-bits. On the other hand, the capacity of ROM necessary for the decoding circuit of this embodiment is as small as 4 kilo-bit. The decoding procedures of 8/12 code and the decoding circuit to be used for this purpose will be explained.

The decoding method of the 8/12 code features as follows:

(1) The top bit of any code word to be decoded must be 1.
(2) The method does not decode the code word itself as a subject to be decoded, but decodes it using identification codes of bit patterns obtained by dividing the code word.

Next, the fact that the decoding can be correctly achieved using the method featured as above will be cleared below. As explained above, in case of the code word of F≠1 of this embodiment, the code word W2 beginning with 1 and the inverse pattern W2' thereof are corresponded to the same data word. As a result, if it is known that the code word to be decoded is of F≠1, it is not required to decode it after identifying whether it is the code word W2 beginning with 1 or the inverse pattern W2' thereof. Accordingly, if the code word is F≠1, the code word W2 and its inverse pattern W2' may correspond to the same identification code.

On the other hand, if the code word is F=1, the code word W2, whose top bit TB is 1, and the inverse pattern W2' of the code word W2, whose top bit TB is 0, correspond to different data words from each other. As a result, when the data word D corresponding to the code word W2 and the data word D' corresponding to the code word W2' are to be optionally selected, it is necessary to output an identification code which can discriminate the code word W2 and its inverse pattern W2'.

However, if the data word D corresponding to the code word W2 and the data word D' corresponding to the code word W2' are complementary, that is, if the data word D' is obtained by inverting all 1 bits of the data word D into 0 and all 0 bits thereof into 1, the identification code for the code word W2 and that for code word W2' can be equal to each other. The reason for this will be shown below. The identification code for the code word W2 is expressed as ID and the data word output for the identification code ID is expressed as D.

In this case, since the identification code for the code word W2' is the ID as well, the data word output therefor becomes D. As a result, if the code word W2 is detected as to be F=1 and TB=0, all 1 bits of the data word D outputted from the decoding circuit are inverted into 0 and all 0 bits thereof are inverted into 1. By this way, the data word D' for the final code word W2' can be obtained.

The decoding circuit structured based on the decoding method shown above will be explained by referring to FIG. 7. In FIG. 7, 12 exclusive OR (EXOR) gates 23 and 12 NOT gates 24 are for transforming a code word of 12 bits to be decoded into a code word surely beginning with 1. As an example, suppose that the code word to be decoded is 100111001100. The top bit TB thereof is 1, and the output of each of the NOT gate 24 becomes 100111001100 because the EXOR gate 23 serves to negate.

Contrary to this, if the code word decoded is 011000110011, then the top bit TB thereof is 0, and each EXOR gate 23 directly outputs the input thereof. As a result, a code word of 100111001100 can be obtained as an output of the NOT gate 24. A provisional decoding circuit 25 generates an identification code for the upper 6 bits of a code word surely beginning with 1 obtained from the output of the NOT gate 24. As seen from Tables 3.1–3.7, the upper 6 bits of a code word surely beginning with 1 exist as 13 kind of patterns as shown in Table 4.

In this case, the identification code (ID) for the upper 6 bits can be expressed by 4 bits. Furthermore, the provisional decoding circuit 25 also outputs the inversion control signal Y as a 1 only when the code word to be decoded is F=1 and TB=0. The inversion control signal Y can be realized with a simple logic circuit. In addition, a provisional decoding circuit 26 in FIG. 7 generates an identification code for the lower 6 bits of a code word surely beginning with 1 obtained from the output of the NOT gate 24. As seen from Tables 3.1–3.7, the lower 6 bits of a code word surely beginning with 1 exist as 26 kinds of patterns as shown in Table 5.

Accordingly, the identification code (ID) for the lower 6 bits thereof can be expressed by 5 bits. The identification codes of 9 bits shown in Tables 6.1 and 6.2 can correspond without duplication to the code words beginning with 1 in Tables 3.1–3.7. A code inverse transform circuit 27 in FIG. 7 realizes Tables 6.1–6.2 and outputs a data word for the identification code of 9 bits.

Each of the eight EXOR gates 28 performs the exclusive OR operation of the inversion control signal Y and each of 8 bits from the inverse transform circuit 27. As explained above, for the code word of F=1, the code word beginning with 1 and the data word corresponding to the inverse pattern thereof are also complementary. As a result, for the code word of F=1 and TB=0, Y=1 results, so that only in this case, the output of each of the EXOR gates 28 becomes a value obtained by inverting each of the outputs of the inverse transform circuit 27, thus providing the correct decoded data.

As explained above, the decoding circuit according to this embodiment of this invention does not use the code word itself but uses the identification code corresponding to a bit pattern obtained by dividing the code word, thereby decreasing the capacity of the ROM necessary for decoding to ½. Concretely, the provisional decoding circuits 25 and 26 each can be easily realized by a comparatively simple logic circuit. Accordingly, the capacity of the ROM necessary for decoding is address 9 bits, 8 bits output: $2^9 \times 8 = 4$ kilo-bits. Also, in this embodiment, the 8/12 code transformation which is very effective in high density recording is exemplified, but not limited thereto, being effective for other recording codes.

Embodiment 2

Figure 8:
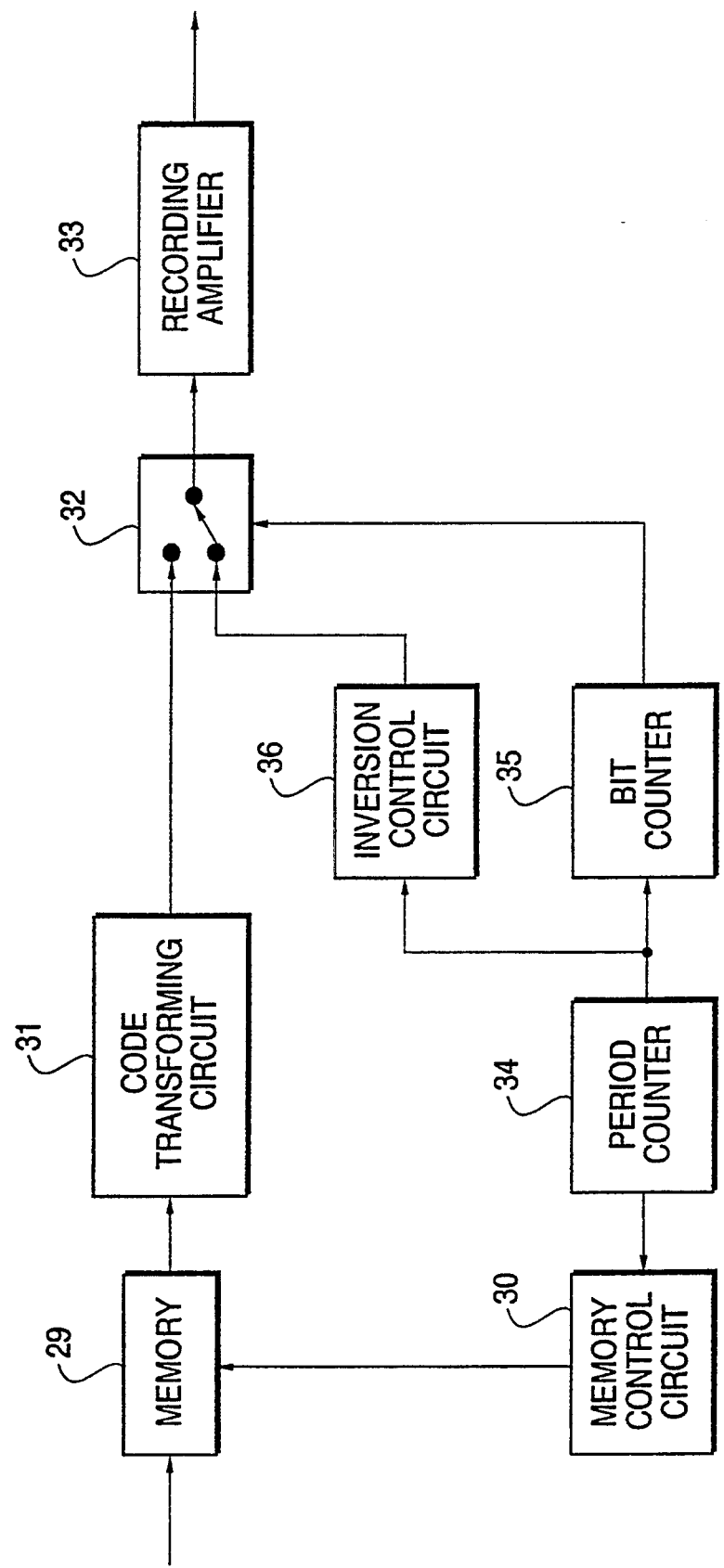
FIG. 8 is a block diagram of a second embodiment of this invention.
Figure 9:
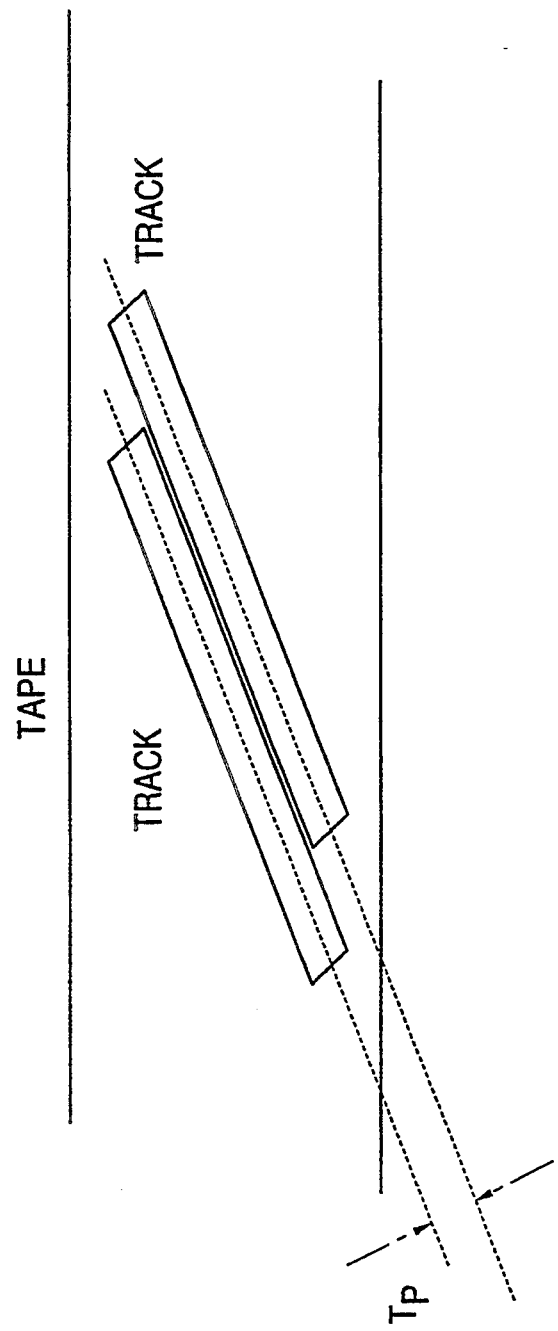
FIG. 9 is a track arrangement diagram of commercially available home-use VCRs.
Figure 10:
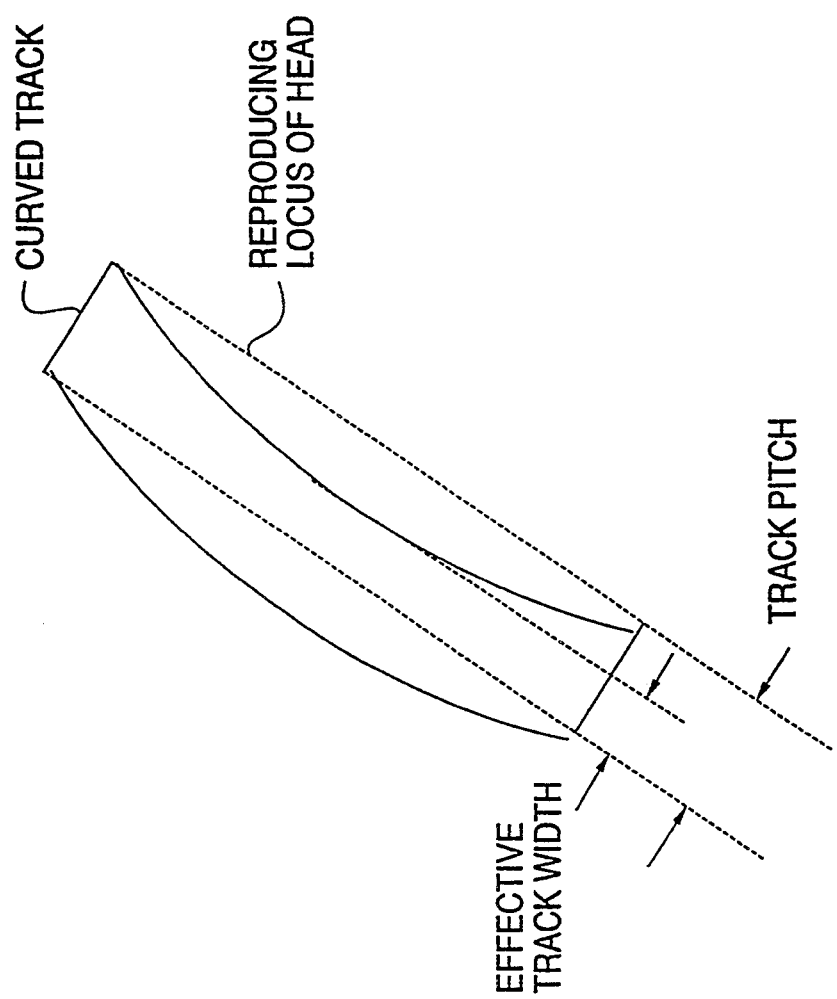
FIG. 10 is a diagram for explaining a reduction in effective track width due to track curving.

FIG. 8 is a block diagram of this embodiment. First the data to be recorded is temporary stored in a memory 29. A memory control circuit 30 generally controls the memory 29 to successively readout the data stored therein. The data thus readout from the memory 29 is sent to a code transforming circuit 31, in which the code transformation for recording is carried out using, for example, the method shown Embodiment 1 of this invention. The recording system thus subjected to the code transformation is sent generally through a switch 32 to a recording amplifier 33.

On the other hand, in case of inserting a pilot pattern, in response to the control signal from a period counter 34, the memory control circuit 30 temporarily interrupts the readout of the data from the memory 29. In addition, the control signal from the period counter 34 is sent to a bit counter 35 and a inversion control circuit 36. The bit counter 35 counts only the number of bits to be inserted in response to the signal from the period counter 34 and outputs a switching signal to the switch 32 only during counting.

The inversion control circuit 36 switches the bit pattern to be inserted to 1s and 0s by the control signal from the period counter 34 and outputs it. For example, 11 and 00 are inserted alternately and periodically, which is outputted, through the switch 32 only during counting, to the recording amplifier 33. After completion of the insertion, the data from the memory 29 is subjected to code-transformation again to be recorded.

For example, in case that 11 and 00 are inserted into the 8/12 code as explained in Embodiment 1, although different in code word length, 11 and 00 can be processed in the entirely same manner as in processing a normal code word of F=1 and E=1. As a result, 11 and 00 can be easily inserted a by the method similar to that of inserting synchronous pattern as shown in Embodiment 1.

Also, although the code word length of a code word to be inserted for the pilot use is different from that of a normal code word, the parallel/serial converter 10 is controlled according to the code word length, and the code word length only for the code word to be inserted for the pilot use is processed as 2 bits, thus the inserting process can be easily performed.

In addition, if the code word for the pilot use is set to be inserted into a specific position in a block, after the detection of the synchronous pattern during reproducing, this code word for the pilot use can be easily removed. The block thus obtained becomes the state before the code word for the pilot use is inserted. As a result, for example, the decoding circuit having a reduced redundancy as explained in Embodiment 1 can be directly applied. As described above, the method of this invention makes it possible to generate a pilot signal which is capable of completely solving the conventional problems with an extremely simple circuit structure.

TABLE 1

| No. | TB | F | E | LB | Example (d = 2, k = 10) |
|-----|----|----|----|----|---|
| 1.1 | 0 | 0 | 0 | 0 | 0 1 1 . . . . . . . 1 1 0 |
| 1.2 | 0 | 0 | 0 | 1 | 0 1 1 . . . . . . . 0 0 1 |
| 1.3 | 1 | 0 | 0 | 0 | 1 0 0 . . . . . . . 1 1 0 |
| 1.4 | 1 | 0 | 0 | 1 | 1 0 0 . . . . . . . 0 0 1 |
| 2.1 | 0 | 0 | 1 | 0 | 0 1 1 . . 1 1 0 0 0 0 0 |
| 2.2 | 1 | 0 | 1 | 1 | 1 0 0 . . 0 0 1 1 1 1 1 |
| 3.1 | 0 | 0 | 1 | 1 | 0 1 1 . . 0 0 1 1 1 1 1 |
| 3.2 | 0 | 0 | 1 | 0 | 1 0 0 . . 1 1 0 0 0 0 0 |
| 4.1 | 0 | 0 | 2 | 0 | 0 1 1 0 0 0 0 0 0 0 0 0 |
| 4.2 | 0 | 0 | 2 | 1 | 0 1 1 0 0 1 1 1 1 1 1 1 |
| 4.3 | 1 | 0 | 2 | 0 | 1 0 0 1 1 1 1 1 1 1 1 1 |
| 4.4 | 1 | 0 | 2 | 1 | 1 0 0 1 1 0 0 0 0 0 0 0 |
| 5.1 | 0 | 1 | 0 | 0 | 0 0 0 0 0 1 1 . . 1 1 0 |
| 5.2 | 0 | 1 | 0 | 1 | 0 0 0 0 0 1 1 . . 0 0 1 |
| 6.1 | 1 | 1 | 0 | 0 | 1 1 1 1 1 0 0 . . 1 1 0 |
| 6.2 | 1 | 1 | 0 | 1 | 1 1 1 1 1 0 0 . . 0 0 1 |
| 7 | 0 | 1 | 1 | 0 | 0 0 0 0 0 1 1 0 0 0 0 0 |
| 8 | 0 | 1 | 1 | 1 | 0 0 1 1 1 1 0 0 0 0 1 1 |
| 9 | 1 | 1 | 1 | 0 | 1 1 0 0 0 0 1 1 0 0 0 0 |
| 10 | 1 | 1 | 1 | 1 | 1 1 1 1 1 0 0 0 0 1 1 1 1 |
| 11.1 | 0 | 1 | 2 | 0 | 0 1 1 0 0 0 0 0 0 0 0 0 |
| 11.2 | 0 | 1 | 2 | 1 | 0 0 1 1 0 0 1 1 1 1 1 1 |
| 12.1 | 1 | 1 | 2 | 0 | 1 1 1 0 0 0 0 0 0 0 0 0 |
| 12.2 | 1 | 1 | 2 | 1 | 1 1 0 0 1 1 1 1 1 1 1 1 |
| 13.1 | 0 | 2 | 0 | 0 | 0 0 0 0 0 0 0 0 0 1 1 0 |
| 13.2 | 0 | 2 | 0 | 1 | 0 0 0 0 0 0 0 0 1 1 0 0 1 |
| 13.3 | 1 | 2 | 0 | 0 | 1 1 1 1 1 1 1 0 0 1 1 0 |
| 13.4 | 1 | 2 | 0 | 1 | 1 1 1 1 1 1 1 1 1 0 0 1 |
| 14.1 | 0 | 2 | 1 | 0 | 0 0 0 0 0 0 0 0 1 1 0 0 |
| 14.2 | 1 | 2 | 1 | 1 | 1 1 1 1 1 1 1 1 1 0 0 1 1 |
| 15.1 | 0 | 2 | 1 | 1 | 0 0 0 0 0 0 0 1 1 1 1 |
| 15.2 | 1 | 2 | 1 | 1 | 1 1 1 1 1 1 1 1 0 0 0 0 |

TABLE 2

| Parameter | | | | | Example (d = 2, k = 10) | |
|---|---|---|---|---|---|---|
| E | LB | F | Y | S | First code word | Second code word |
| 0 | 0 | 0 | 1 | — | . . . . . . . . . 1 1 0 0 1 1 | . . . . . . . . . . . . . . |
| 0 | 1 | 0 | 0 | — | . . . . . . . . . 0 0 1 1 0 0 | . . . . . . . . . . . . . . |
| 0 | 0 | 1 | 0 | 0 | . . . . . . . . . 1 1 0 0 0 0 0 0 1 1 . . . . . |
| 0 | 1 | 1 | 0 | 1 | . . . . . . . . . 0 0 1 1 1 1 1 1 0 0 . . . . . |
| 0 | 0 | 2 | 1 | — | . . . . . . . . . 1 1 0 0 0 0 0 0 0 0 0 0 1 1 . |
| 0 | 1 | 2 | 0 | — | . . . . . . . . . 0 0 1 1 1 1 1 1 1 1 1 1 0 0 . |
| 1 | 0 | 0 | 1 | — | . . . . . 1 1 0 0 0 0 0 0 1 1 | . . . . . . . . . . . . . . |
| 1 | 1 | 0 | 0 | — | . . . . . 0 0 1 1 1 1 1 1 0 0 | . . . . . . . . . . . . . . |
| 1 | 0 | 1 | 0 | — | . . . . . 1 1 0 0 0 0 0 1 1 1 1 0 0 . . . . . |
| 1 | 0 | 1 | 0 | — | . . . . . 1 1 0 0 0 0 0 0 0 0 1 1 . . . . . . |
| 1 | 1 | 1 | 0 | — | . . . . . 0 0 1 1 1 1 1 1 1 1 1 0 0 . . . . . |
| 1 | 1 | 1 | 0 | — | . . . . . 0 0 1 1 1 1 1 0 0 0 0 1 1 . . . . . |
| 1 | 0 | 2 | 0 | — | . . . . . 1 1 0 0 0 0 0 1 1 1 1 1 1 1 1 0 0 . |
| 1 | 1 | 2 | 1 | — | . . . . . 0 0 1 1 1 1 1 1 0 0 0 0 0 0 0 1 1 . |
| 2 | 0 | 0 | 1 | — | . 1 1 0 0 0 0 0 0 0 0 0 1 1 | . . . . . . . . . . . . . . |
| 2 | 1 | 0 | 0 | — | . 0 0 1 1 1 1 1 1 1 1 1 0 0 | . . . . . . . . . . . . . . |
| 2 | 0 | 1 | 0 | 0 | . 1 1 0 0 0 0 0 0 0 1 1 1 1 0 0 . . . . . . |
| 2 | 1 | 1 | 0 | 1 | . 0 0 1 1 1 1 1 1 1 0 0 0 0 1 1 . . . . . . |
| 2 | 0 | 2 | 0 | — | . 1 1 0 0 0 0 0 0 0 1 1 1 1 1 1 1 1 0 0 . |
| 2 | 1 | 2 | 1 | — | . 0 0 1 1 1 1 1 1 1 0 0 0 0 0 0 0 0 1 1 . |

TABLE 3.1

| No. | Code word | DP | No. | Code word | DP |
|-----|-----------|----|----|-----------|----|
| 0 | 1 1 1 1 0 0 1 1 0 0 0 0 | 0 | 30 | 1 1 1 1 0 0 1 1 1 1 0 0 | 4 |
| 1 | 1 1 1 0 0 1 1 1 0 0 0 0 | 0 | 31 | 1 1 1 0 0 1 1 1 1 1 0 0 | 4 |
| 2 | 1 1 1 1 0 0 0 1 1 0 0 0 | 0 | 32 | 1 1 0 0 1 1 1 1 1 1 0 0 | 4 |
| 3 | 1 1 1 0 0 0 1 1 0 0 0 0 | 0 | 33 | 1 1 0 0 0 0 0 1 1 0 0 0 | 4 |
| 4 | 1 1 0 0 1 1 1 1 0 0 0 0 | 0 | 34 | 1 1 0 0 1 1 1 0 0 0 0 0 | 2 |
| 5 | 1 1 1 1 0 0 0 0 1 1 0 0 | 0 | 35 | 1 1 1 1 0 0 0 1 1 1 0 0 | 2 |
| 6 | 1 1 0 0 1 1 1 1 1 0 0 0 | 0 | 36 | 1 1 1 0 0 1 1 0 0 0 0 0 | 2 |
| 7 | 1 1 1 0 0 0 1 1 1 0 0 0 | 0 | 37 | 1 1 1 0 0 1 1 1 1 0 0 0 | 2 |
| 8 | 1 1 0 0 1 1 0 1 1 0 0 0 | 0 | 38 | 1 1 1 0 0 0 0 1 1 0 0 0 | 2 |
| 9 | 1 1 0 0 0 0 1 1 1 0 0 0 | 0 | 39 | 1 1 1 1 0 0 1 1 1 0 0 0 | 2 |
| 10 | 1 1 0 0 0 0 0 0 1 1 1 0 | 0 | 40 | 1 1 1 1 0 0 0 0 0 1 1 1 | 2 |
| 11 | 1 1 0 0 0 0 0 0 0 1 1 0 | 0 | 41 | 1 1 0 0 1 1 0 0 0 1 1 1 | 2 |
| 12 | 1 1 1 1 0 0 0 0 0 0 1 1 | 0 | 42 | 1 1 1 0 0 1 1 0 0 0 1 1 | 2 |

TABLE 3.1-continued

| No. | Code word | DP | No. | Code word | DP |
|---|---|---|---|---|---|
| 13 | 1 1 0 0 0 1 1 0 0 0 1 1 | 0 | 43 | 1 1 0 0 0 1 1 0 0 1 1 1 | 2 |
| 14 | 1 1 0 0 1 1 0 0 0 0 1 1 | 0 | 44 | 1 1 1 0 0 0 1 1 0 0 1 1 | 2 |
| 15 | 1 1 0 0 0 1 1 0 0 1 1 1 | 0 | 45 | 1 1 0 0 0 0 0 0 1 1 1 1 | 2 |
| 16 | 1 1 1 0 0 0 1 1 0 0 0 0 | 2 | 46 | 1 1 1 0 0 0 0 0 1 1 1 1 | 2 |
| 17 | 1 1 1 0 0 0 1 1 1 0 0 0 | 2 | 47 | 1 1 0 0 1 1 1 0 0 0 1 1 | 2 |
| 18 | 1 1 0 0 0 0 1 1 1 0 0 0 | 2 | 48 | 1 1 1 1 1 0 0 0 0 0 1 1 | 2 |
| 19 | 1 1 1 1 1 0 0 1 1 0 0 0 | 2 | 49 | 1 1 0 0 0 1 1 1 0 0 1 1 | 2 |
| 20 | 1 1 0 0 1 1 1 1 1 0 0 0 | 2 | 50 | 1 1 0 0 0 0 1 1 1 1 1 1 | 2 |
| 21 | 1 1 1 0 0 0 0 0 1 1 0 0 | 2 | 51 | 1 1 1 0 0 0 0 1 1 1 1 1 | 2 |
| 22 | 1 1 1 1 1 0 0 0 1 1 0 0 | 2 | 52 | 1 1 1 1 0 0 0 0 1 1 1 1 | 4 |
| 23 | 1 1 0 0 0 1 1 1 0 0 0 0 | 2 | 53 | 1 1 1 1 1 0 0 0 0 1 1 1 | 4 |
| 24 | 1 1 0 0 0 1 1 1 1 1 0 0 | 2 | 54 | 1 1 1 0 0 0 0 1 1 1 1 1 | 4 |
| 25 | 1 1 0 0 0 0 0 1 1 0 0 0 | 2 | 55 | 1 1 0 0 1 1 0 0 1 1 1 1 | 4 |
| 26 | 1 1 0 0 0 0 1 1 0 0 0 0 | 4 | 56 | 1 1 1 0 0 1 1 0 0 1 1 1 | 4 |
| 27 | 1 1 0 0 0 1 1 0 0 0 0 0 | 4 | 57 | 1 1 0 0 1 1 1 0 0 1 1 1 | 4 |
| 28 | 1 1 1 1 1 0 0 1 1 0 0 0 | 4 | 58 | 1 1 1 0 0 1 1 1 0 0 1 1 | 4 |
| 29 | 1 1 0 0 0 1 1 0 0 0 0 0 | 4 | 59 | 1 1 0 0 1 1 1 1 0 0 1 1 | 4 |

TABLE 3.2

| No. | Code word | DP | No. | Code word | DP |
|---|---|---|---|---|---|
| 60 | 1 1 1 1 0 0 1 1 0 0 1 1 | 4 | 229 | 0 0 1 1 1 1 1 0 0 1 1 1 | 4 |
| 61 | 1 1 0 0 0 0 0 0 0 1 1 | 4 | 228 | 0 0 1 1 1 1 0 0 1 1 1 1 | 4 |
| 62 | 1 1 1 1 0 0 0 1 1 1 1 1 | 6 | 227 | 0 0 0 0 0 1 1 0 0 1 1 1 | 4 |
| 63 | 1 1 1 1 0 0 0 1 1 1 1 1 | 6 | 226 | 0 0 1 1 1 0 0 1 1 1 1 1 | 4 |
| 255 | 0 0 0 0 1 1 0 0 1 1 1 1 | 0 | 225 | 0 0 0 1 1 0 0 1 1 1 1 1 | 4 |
| 254 | 0 0 0 1 1 0 0 0 1 1 1 1 | 0 | 224 | 0 0 0 1 1 0 0 0 0 1 1 1 | 4 |
| 253 | 0 0 0 0 1 1 1 0 0 1 1 1 | 0 | 223 | 0 0 1 1 0 0 0 0 0 1 1 1 | 4 |
| 252 | 0 0 1 1 0 0 0 0 1 1 1 1 | 0 | 222 | 0 0 1 1 1 1 1 1 0 1 1 1 | 4 |
| 251 | 0 0 1 1 0 0 0 1 1 1 1 1 | 0 | 221 | 0 0 1 1 0 0 0 1 1 1 1 1 | 2 |
| 250 | 0 0 0 0 1 1 1 1 0 0 1 1 | 0 | 220 | 0 0 0 0 1 1 1 0 0 1 1 1 | 2 |
| 249 | 0 0 1 1 1 0 0 0 0 1 1 1 | 0 | 219 | 0 0 0 1 1 0 0 1 1 1 1 1 | 2 |
| 248 | 0 0 0 1 1 1 0 0 0 1 1 1 | 0 | 218 | 0 0 0 1 1 0 0 0 1 1 1 1 | 2 |
| 247 | 0 0 1 1 0 0 1 1 0 0 1 1 | 0 | 217 | 0 0 0 1 1 1 1 0 0 1 1 1 | 2 |
| 246 | 0 0 1 1 1 1 0 0 0 1 1 1 | 0 | 216 | 0 0 0 0 1 1 0 0 0 1 1 1 | 2 |
| 245 | 0 0 1 1 1 1 1 1 0 0 0 0 | 0 | 215 | 0 0 0 0 1 1 1 1 0 0 0 0 | 2 |
| 244 | 0 0 0 0 1 1 1 1 1 0 0 0 | 0 | 214 | 0 0 1 1 0 0 1 1 1 0 0 0 | 2 |
| 243 | 0 0 0 0 1 1 1 1 1 1 0 0 | 0 | 213 | 0 0 0 1 1 0 0 1 1 1 0 0 | 2 |
| 242 | 0 0 1 1 1 0 0 1 1 0 0 0 | 0 | 212 | 0 0 1 1 1 0 0 1 1 0 0 0 | 2 |
| 241 | 0 0 1 1 0 0 1 1 1 0 0 0 | 0 | 211 | 0 0 0 1 1 1 0 0 1 1 0 0 | 2 |
| 240 | 0 0 1 1 1 1 0 0 1 0 0 0 | 0 | 210 | 0 0 1 1 1 1 1 1 1 0 0 0 | 2 |
| 239 | 0 0 0 1 1 1 0 0 1 1 1 1 | 2 | 209 | 0 0 0 1 1 1 1 1 1 0 0 0 | 2 |
| 238 | 0 0 0 1 1 1 0 0 0 0 1 1 | 2 | 208 | 0 0 1 1 0 0 0 1 1 0 0 0 | 2 |
| 237 | 0 0 1 1 1 1 0 0 0 1 1 1 | 2 | 207 | 0 0 0 0 1 1 1 1 1 0 0 0 | 2 |
| 236 | 0 0 0 0 0 1 1 0 0 1 1 1 | 2 | 206 | 0 0 1 1 1 0 0 0 1 1 0 0 | 2 |
| 235 | 0 0 1 1 0 0 0 0 0 1 1 1 | 2 | 205 | 0 0 1 1 1 1 1 0 0 0 0 0 | 2 |
| 234 | 0 0 0 1 1 1 1 0 0 1 1 1 | 2 | 204 | 0 0 0 1 1 1 1 0 0 0 0 0 | 2 |
| 233 |   0 0 0 1 1 1 0 0 1 1 1 | 2 | 203 | 0 0 0 0 1 1 1 0 0 0 0 0 | 4 |
| 232 | 0 0 1 1 1 0 0 0 1 1 1 1 | 2 | 202 | 0 0 0 0 0 1 1 1 1 0 0 0 | 4 |
| 231 | 0 0 1 1 1 0 0 0 0 1 1 1 | 2 | 201 | 0 0 0 1 1 1 1 0 0 0 0 0 | 4 |
| 230 | 0 0 1 1 1 1 1 0 0 1 1 1 | 2 | 200 | 0 0 1 1 0 0 1 0 0 0 0 0 | 4 |

TABLE 3.3

| No. | Code word | DP | No. | Code word | DP |
|---|---|---|---|---|---|
| 199 | 0 0 0 1 1 0 0 1 1 0 0 0 | 4 | 86 | 1 0 0 0 0 0 0 0 1 1 0 0 | 6 |
| 198 | 0 0 1 1 0 0 0 1 1 0 0 0 | 4 | 87 | 1 0 0 0 0 0 0 1 1 1 1 1 | 0 |
| 197 | 0 0 0 1 1 0 0 0 1 1 0 0 | 4 | 88 | 1 0 0 0 1 1 0 0 0 1 1 1 | 0 |
| 196 | 0 0 1 1 0 0 0 0 1 1 0 0 | 4 | 89 | 1 0 0 1 1 0 0 0 0 1 1 1 | 0 |
| 195 | 0 0 0 0 1 1 0 0 1 1 0 0 | 4 | 90 | 1 0 0 0 1 1 0 0 1 1 1 1 | 0 |
| 194 | 0 0 1 1 1 1 1 1 1 1 0 0 | 4 | 91 | 1 0 0 0 1 1 1 0 0 0 1 1 | 0 |
| 193 | 0 0 0 0 1 1 1 0 0 0 0 0 | 6 | 92 | 1 0 0 1 1 1 1 0 0 0 1 1 | 0 |
| 192 | 0 0 0 0 0 1 1 1 1 0 0 0 | 6 | 93 | 1 0 0 0 0 1 1 1 1 0 0 0 | 0 |
| 64 | 1 0 0 1 1 1 1 0 0 0 0 0 | 0 | 94 | 1 0 0 1 1 0 0 1 1 1 1 1 | 2 |
| 65 | 1 0 0 0 1 1 1 1 0 0 0 0 | 0 | 95 | 1 0 0 0 0 0 0 1 1 1 1 1 | 2 |
| 66 | 1 0 0 1 0 0 1 1 0 0 0 0 | 0 | 96 | 1 0 0 1 1 0 0 0 1 1 1 1 | 2 |
| 67 | 1 0 0 1 1 1 0 0 1 0 0 0 | 0 | 97 | 1 0 0 1 1 0 0 0 1 1 1 1 | 2 |
| 68 | 1 0 0 0 1 1 1 1 1 0 0 0 | 2 | 98 | 1 0 0 1 1 1 0 0 0 0 1 1 | 2 |
| 69 | 1 0 0 0 1 1 1 0 0 0 0 0 | 2 | 99 | 1 0 0 0 1 1 0 0 0 0 1 1 | 2 |
| 70 | 1 0 0 1 1 1 1 1 0 0 0 0 | 2 | 100 | 1 0 0 0 1 1 1 0 0 1 1 1 | 2 |
| 71 | 1 0 0 1 1 1 0 0 0 0 0 0 | 2 | 101 | 1 0 0 0 0 1 1 0 0 1 1 1 | 2 |
| 72 | 1 0 0 1 1 0 0 1 1 0 0 0 | 2 | 154 | 1 0 0 0 1 1 0 0 1 1 1 1 | 2 |
| 73 | 1 0 0 1 1 0 0 1 1 0 0 0 | 2 | 155 | 1 0 0 1 0 0 0 0 0 1 1 1 | 2 |
| 74 | 1 0 0 0 1 1 0 0 1 1 0 0 | 2 | 156 | 1 0 0 0 0 1 1 0 0 1 1 1 | 2 |
| 75 | 1 0 0 0 0 1 1 1 1 0 0 0 | 2 | 157 | 1 0 0 1 1 0 0 1 0 1 1 1 | 4 |
| 76 | 1 0 0 0 0 0 1 1 1 0 0 0 | 2 | 158 | 1 0 0 1 1 0 0 1 1 1 1 1 | 4 |
| 77 | 1 0 0 0 1 1 1 1 1 0 0 0 | 2 | 159 | 1 0 0 0 0 0 0 0 0 1 1 1 | 4 |
| 78 | 1 0 0 0 0 0 1 1 1 0 0 0 | 4 | 160 | 1 0 0 1 1 1 1 0 0 1 1 1 | 4 |

TABLE 3.3-continued

| No. | Code word | DP | No. | Code word | DP |
|---|---|---|---|---|---|
| 79 | 1 0 0 0 1 1 1 0 0 0 0 0 | 4 | 161 | 1 0 0 1 1 1 0 0 1 1 1 1 | 4 |
| 80 | 1 0 0 0 0 1 1 1 0 0 0 0 | 4 | 162 | 1 0 0 0 0 0 0 0 0 0 1 1 | 6 |
| 81 | 1 0 0 0 0 0 0 1 1 1 0 0 | 4 | 163 | 1 1 1 1 1 1 1 0 0 0 0 0 | 2 |
| 82 | 1 0 0 1 1 1 1 1 1 1 0 0 | 4 | 164 | 1 1 1 1 1 1 0 0 1 1 0 0 | 4 |
| 83 | 1 0 0 0 0 0 1 1 0 0 0 0 | 6 | 165 | 1 1 1 1 1 1 1 1 0 0 0 0 | 4 |
| 84 | 1 0 0 0 0 1 1 0 0 0 0 0 | 6 | 166 | 1 1 1 1 1 1 1 1 1 0 0 0 | 6 |
| 85 | 1 0 0 0 0 0 0 1 1 0 0 0 | 6 | 167 | 1 1 1 1 1 1 0 0 0 0 1 1 | 4 |

TABLE 3.4

| No. | Code word | DP |
|---|---|---|
| 168 | 1 1 1 1 1 1 1 0 0 0 1 1 | 6 |
| 169 | 1 1 1 1 1 1 0 0 0 1 1 1 | 6 |

| No. | Code word 1 | DP | Code word 2 | DP |
|---|---|---|---|---|
| 102 | 1 1 1 1 0 0 0 0 0 1 1 0 | 0 | 1 1 1 1 1 0 0 0 0 0 0 1 | 0 |
| 103 | 1 1 1 0 0 0 0 0 1 1 1 0 | 0 | 1 1 1 0 0 0 1 1 0 0 0 1 | 0 |
| 104 | 1 1 0 0 1 1 0 0 0 1 1 0 | 0 | 1 1 1 0 0 1 1 0 0 0 0 1 | 0 |
| 105 | 1 1 0 0 0 1 1 0 0 1 1 0 | 0 | 1 1 1 0 0 0 0 1 1 0 0 1 | 0 |
| 106 | 1 1 0 0 0 0 1 1 1 1 1 0 | 0 | 1 1 0 0 0 1 1 1 0 0 0 1 | 0 |
| 107 | 1 1 1 1 0 0 0 0 0 1 1 0 | 2 | 1 1 0 0 1 1 0 0 0 0 0 1 | 0 |
| 108 | 1 1 1 0 0 0 0 0 0 1 1 0 | 2 | 1 1 0 0 0 0 1 1 1 0 0 1 | 0 |
| 109 | 1 1 0 0 1 1 0 0 1 1 1 0 | 2 | 1 1 1 1 0 0 0 1 1 0 0 1 | 2 |
| 110 | 1 1 1 1 1 0 0 0 0 1 1 0 | 2 | 1 1 1 1 0 0 0 0 0 0 0 1 | 2 |
| 111 | 1 1 0 0 1 1 1 0 0 1 1 0 | 2 | 1 1 1 0 0 1 1 0 0 0 0 1 | 2 |
| 112 | 1 1 1 0 0 1 1 0 0 1 1 0 | 2 | 1 1 1 1 0 0 1 1 0 0 0 1 | 2 |
| 113 | 1 1 0 0 0 0 1 1 1 1 1 0 | 2 | 1 1 0 0 1 1 1 1 0 0 0 1 | 2 |
| 114 | 1 1 1 0 0 0 0 1 1 1 1 0 | 2 | 1 1 0 0 0 1 1 0 0 0 0 1 | 2 |
| 115 | 1 1 0 0 0 0 0 1 1 1 1 0 | 2 | 1 1 0 0 0 1 1 1 1 0 0 1 | 2 |
| 116 | 1 1 1 1 1 0 0 0 1 1 1 0 | 4 | 1 1 0 0 0 0 1 1 0 0 0 1 | 2 |
| 117 | 1 1 1 1 0 0 0 1 1 1 1 0 | 4 | 1 1 1 0 0 0 1 1 1 0 0 1 | 2 |
| 118 | 1 1 0 0 0 1 1 1 1 1 1 0 | 4 | 1 1 0 0 1 1 0 0 0 0 0 1 | 2 |
| 119 | 1 1 1 0 0 0 1 1 1 1 1 0 | 4 | 1 1 0 0 0 0 0 1 1 0 0 1 | 2 |
| 120 | 1 1 0 0 0 0 0 0 0 1 1 0 | 4 | 1 1 1 0 0 1 1 1 1 0 0 1 | 4 |
| 121 | 1 1 1 1 1 0 0 1 1 1 1 0 | 6 | 1 1 1 1 1 0 0 1 1 0 0 1 | 4 |
| 122 | 1 1 1 0 0 1 1 1 1 1 1 0 | 6 | 1 1 1 0 0 0 0 0 0 0 0 1 | 4 |
| 123 | 1 1 0 0 1 1 1 1 1 1 1 0 | 6 | 1 1 0 0 1 1 1 1 1 0 0 1 | 4 |
| 124 | 1 1 1 1 0 0 1 1 1 1 1 0 | 6 | 1 1 1 1 0 0 1 1 0 0 0 1 | 4 |
| 153 | 0 0 0 0 1 1 1 1 1 0 0 1 | 0 | 0 0 0 0 0 1 1 1 1 1 1 0 | 0 |
| 152 | 0 0 0 1 1 1 1 1 0 0 0 1 | 0 | 0 0 0 1 1 1 0 0 1 1 1 0 | 0 |

TABLE 3.5

| No. | Code word 1 | DP | Code word 2 | DP |
|---|---|---|---|---|
| 151 | 0 0 1 1 0 0 1 1 1 0 0 1 | 0 | 0 0 0 1 1 0 0 1 1 1 1 0 | 0 |
| 150 | 0 0 1 1 1 0 0 1 1 0 0 1 | 0 | 0 0 0 1 1 1 1 0 0 1 1 0 | 0 |
| 149 | 0 0 1 1 1 1 1 0 0 0 0 1 | 0 | 0 0 1 1 1 0 0 0 1 1 1 0 | 0 |
| 148 | 0 0 0 0 1 1 1 1 0 0 0 1 | 2 | 0 0 1 1 0 0 0 1 1 1 1 0 | 0 |
| 147 | 0 0 0 1 1 1 1 1 1 0 0 1 | 2 | 0 0 1 1 1 0 0 1 1 0 0 1 0 | 0 |
| 146 | 0 0 1 1 0 0 1 1 0 0 0 1 | 2 | 0 0 0 0 1 1 1 0 0 1 1 0 | 2 |
| 145 | 0 0 0 0 0 1 1 1 1 0 0 1 | 2 | 0 0 0 0 1 1 1 1 1 1 1 0 | 2 |
| 144 | 0 0 1 1 0 0 0 1 1 0 0 1 | 2 | 0 0 0 1 1 0 0 0 1 1 1 0 | 2 |
| 143 | 0 0 0 1 1 0 0 1 1 0 0 1 | 2 | 0 0 0 0 1 1 0 0 1 1 1 0 | 2 |
| 142 | 0 0 1 1 1 1 0 0 0 0 0 1 | 2 | 0 0 1 1 0 0 0 0 1 1 1 0 | 2 |
| 141 | 0 0 0 1 1 1 1 0 0 0 0 1 | 2 | 0 0 1 1 1 0 0 1 1 1 1 0 | 2 |
| 140 | 0 0 1 1 1 1 1 0 0 0 0 1 | 2 | 0 0 1 1 1 0 0 0 0 1 1 0 | 2 |
| 139 | 0 0 0 0 0 1 1 1 0 0 0 1 | 4 | 0 0 1 1 1 0 0 1 1 1 1 0 | 2 |
| 138 | 0 0 0 0 1 1 1 0 0 0 0 1 | 4 | 0 0 0 1 1 1 0 0 0 1 1 0 | 2 |
| 137 | 0 0 1 1 1 0 0 0 0 0 0 1 | 4 | 0 0 1 1 0 0 1 1 1 1 1 0 | 2 |
| 136 | 0 0 0 1 1 1 0 0 0 0 0 1 | 4 | 0 0 1 1 1 1 1 1 0 0 1 1 0 | 2 |
| 135 | 0 0 1 1 1 1 1 1 1 0 0 1 | 4 | 0 0 0 1 1 1 0 0 0 0 1 1 0 | 4 |
| 134 | 0 0 0 0 0 1 1 0 0 0 0 1 | 6 | 0 0 0 0 0 1 1 0 0 1 1 0 | 4 |
| 133 | 0 0 1 1 0 0 0 0 0 0 0 1 | 6 | 0 0 0 1 1 1 1 1 1 1 1 0 | 4 |
| 132 | 0 0 1 1 0 0 0 0 0 0 0 1 | 6 | 0 0 1 1 0 0 0 0 0 1 1 0 | 4 |
| 131 | 0 0 0 0 1 1 0 0 0 0 0 1 | 6 | 0 0 0 0 0 1 1 0 0 1 1 0 | 4 |
| 125 | 1 1 1 1 1 0 0 0 0 0 0 0 | 2 | 1 1 0 0 0 0 1 1 1 1 1 1 | 4 |
| 126 | 1 1 1 1 0 0 0 0 0 0 0 0 | 4 | 1 1 1 0 0 0 1 1 1 1 1 1 | 6 |
| 127 | 1 1 0 0 1 1 0 0 0 0 0 0 | 4 | 1 1 0 0 0 1 1 1 1 1 1 1 | 6 |
| 130 | 0 0 0 0 0 1 1 1 1 1 1 1 | 2 | 0 0 1 1 1 1 0 0 0 0 0 0 | 4 |
| 129 | 0 0 0 0 1 1 1 1 1 1 1 1 | 4 | 0 0 0 0 1 1 0 0 0 0 0 0 | 6 |
| 128 | 0 0 1 1 0 0 1 1 1 1 1 1 | 4 | 0 0 1 1 1 0 0 0 0 0 0 0 | 6 |
| 170 | 1 0 0 1 1 0 0 0 1 1 1 0 | 0 | 1 0 0 1 1 0 0 1 1 0 0 1 | 0 |
| 171 | 1 0 0 1 1 1 0 0 0 1 1 0 | 0 | 1 0 0 0 1 1 1 1 0 0 0 1 | 0 |
| 172 | 1 0 0 0 1 1 0 0 1 1 1 0 | 0 | 1 0 0 1 1 1 1 0 0 0 0 1 | 0 |

TABLE 3.6

| No. | Code word 1 | DP | Code word 2 | DP |
|---|---|---|---|---|
| 173 | 1 0 0 0 1 1 1 0 0 1 1 0 | 0 | 1 0 0 0 0 1 1 1 1 0 0 1 | 0 |
| 174 | 1 0 0 0 0 0 1 1 1 1 1 0 | 0 | 1 0 0 0 1 1 1 0 0 0 0 1 | 2 |
| 175 | 1 0 0 1 1 1 0 0 1 1 1 0 | 2 | 1 0 0 0 0 1 1 1 0 0 0 1 | 2 |
| 176 | 1 0 0 1 1 0 0 1 1 1 1 0 | 2 | 1 0 0 1 1 1 0 0 0 0 0 1 | 2 |
| 177 | 1 0 0 1 1 0 0 0 0 1 1 0 | 2 | 1 0 0 1 1 1 1 1 0 0 0 1 | 2 |
| 178 | 1 0 0 1 1 1 1 0 0 1 1 0 | 2 | 1 0 0 0 1 1 1 1 1 0 0 1 | 2 |
| 179 | 1 0 0 0 0 1 1 1 0 0 1 0 | 2 | 1 0 0 0 0 0 1 1 1 0 0 1 | 2 |
| 180 | 1 0 0 0 1 1 0 0 0 1 1 0 | 2 | 1 0 0 0 0 1 1 0 0 0 0 1 | 4 |
| 181 | 1 0 0 0 0 1 1 1 1 1 1 0 | 2 | 1 0 0 0 0 0 1 1 0 0 0 1 | 4 |
| 182 | 1 0 0 0 0 0 1 1 1 1 1 0 | 2 | 1 0 0 0 1 1 0 0 0 0 0 1 | 4 |
| 183 | 1 0 0 0 1 1 1 1 1 1 1 0 | 4 | 1 0 0 1 1 0 0 0 0 0 0 1 | 4 |
| 184 | 1 0 0 0 0 0 0 0 1 1 1 0 | 4 | 1 0 0 1 1 1 1 1 1 0 0 1 | 4 |
| 185 | 1 0 0 1 1 1 1 1 1 1 1 0 | 6 | 1 0 0 0 0 0 0 1 1 0 0 1 | 4 |
| 186 | 1 0 0 1 1 1 0 0 0 0 0 0 | 4 | 1 0 0 0 0 0 1 1 1 1 1 1 | 2 |
| 187 | 1 0 0 1 1 0 0 0 0 0 0 0 | 6 | 1 0 0 0 0 1 1 1 1 1 1 1 | 4 |
| 188 | 1 0 0 0 1 1 0 0 0 0 0 0 | 6 | 1 0 0 0 1 1 1 1 1 1 1 1 | 6 |
| 189 | 1 1 1 1 1 1 0 0 0 1 1 0 | 4 | 1 1 1 1 1 1 0 0 0 0 0 1 | 2 |
| 190 | 1 1 1 1 1 1 0 0 1 1 1 0 | 6 | 1 1 1 1 1 1 1 0 0 0 0 1 | 4 |
| 191 | 1 1 1 1 1 1 1 0 0 1 1 0 | 6 | 1 1 1 1 1 1 1 1 0 0 0 1 | 6 |

TABLE 3.7

| No. | Code word | DP |
|---|---|---|
| 256 | 1 1 1 1 1 0 0 1 1 1 1 1 | 8 |
| 257 | 0 0 0 0 0 1 1 0 0 0 0 0 | 8 |
| 258 | 1 1 1 1 1 1 0 0 1 1 1 1 | 8 |
| 259 | 1 1 1 1 1 1 1 0 0 1 1 1 | 8 |
| 260 | 1 1 1 1 1 1 1 1 0 0 1 1 | 8 |

| No. | Code word 1 | DP | Code word 2 | DP |
|---|---|---|---|---|
| 261 | 1 1 1 0 0 0 0 0 0 0 0 0 | 6 | 1 1 0 0 1 1 1 1 1 1 1 1 | 8 |
| 262 | 0 0 0 1 1 1 1 1 1 1 1 1 | 6 | 0 0 1 1 0 0 0 0 0 0 0 0 | 8 |
| 263 | 1 0 0 0 0 0 0 0 0 1 1 0 | 6 | 1 0 0 0 0 0 0 0 0 0 0 1 | 8 |

TABLE 4

| ID | Bit pattern |
|---|---|
| 0 | 1 0 0 0 0 0 |
| 1 | 1 0 0 0 0 1 |
| 2 | 1 0 0 0 1 1 |
| 3 | 1 0 0 1 1 0 |
| 4 | 1 0 0 1 1 1 |
| 5 | 1 1 0 0 0 0 |
| 6 | 1 1 0 0 0 1 |
| 7 | 1 1 1 0 1 1 |
| 8 | 1 1 1 0 0 0 |
| 9 | 1 1 1 0 0 1 |
| 10 | 1 1 1 1 0 0 |
| 11 | 1 1 1 1 1 0 |
| 12 | 1 1 1 1 1 1 |

TABLE 5

| ID | Bit pattern |
|---|---|
| 0 | 1 0 0 0 0 0 |
| 1 | 1 0 0 0 0 1 |
| 2 | 1 0 0 0 1 1 |
| 3 | 1 0 0 1 1 0 |
| 4 | 1 0 0 1 1 1 |
| 5 | 1 1 0 0 0 0 |
| 6 | 1 1 0 0 0 1 |
| 7 | 1 1 0 0 1 1 |
| 8 | 1 1 1 0 0 0 |
| 9 | 1 1 1 0 0 1 |

TABLE 5-continued

| ID | Bit pattern |
|---|---|
| 10 | 1 1 1 1 0 0 |
| 11 | 1 1 1 1 1 0 |
| 12 | 1 1 1 1 1 1 |
| 16 | 0 1 1 1 1 1 |
| 17 | 0 1 1 1 1 0 |
| 18 | 0 1 1 1 0 0 |
| 19 | 0 1 1 0 0 1 |
| 20 | 0 1 1 0 0 0 |
| 21 | 0 0 1 1 1 1 |
| 22 | 0 0 1 1 1 0 |
| 23 | 0 0 1 1 0 0 |
| 24 | 0 0 0 1 1 1 |
| 25 | 0 0 0 1 1 0 |
| 26 | 0 0 0 0 1 1 |
| 27 | 0 0 0 0 0 1 |
| 28 | 0 0 0 0 0 0 |

TABLE 6.1

| No. | ID | No. | ID | No. | ID | No. | ID |
|---|---|---|---|---|---|---|---|
| 0 | 325 | 30 | 330 | 60 | 327 | 90 | 36 |
| 1 | 293 | 31 | 298 | 61 | 186 | 91 | 66 |
| 2 | 340 | 32 | 234 | 62 | 336 | 92 | 154 |
| 3 | 264 | 33 | 183 | 63 | 373 | 93 | 39 |
| 4 | 229 | 34 | 224 | 64 | 133 | 94 | 85 |
| 5 | 343 | 35 | 338 | 65 | 72 | 95 | 21 |
| 6 | 200 | 36 | 288 | 66 | 114 | 96 | 152 |
| 7 | 274 | 37 | 296 | 67 | 151 | 97 | 117 |
| 8 | 247 | 38 | 276 | 68 | 42 | 98 | 130 |
| 9 | 170 | 39 | 328 | 69 | 69 | 99 | 90 |
| 10 | 181 | 40 | 344 | 70 | 136 | 100 | 71 |
| 11 | 280 | 41 | 248 | 71 | 128 | 101 | 34 |
| 12 | 346 | 42 | 290 | 72 | 119 | 154 | 68 |
| 13 | 194 | 43 | 196 | 73 | 116 | 155 | 122 |
| 14 | 250 | 44 | 263 | 74 | 87 | 156 | 7 |
| 15 | 167 | 45 | 184 | 75 | 40 | 157 | 132 |
| 16 | 261 | 46 | 282 | 76 | 10 | 158 | 112 |
| 17 | 266 | 47 | 226 | 77 | 74 | 159 | 24 |
| 18 | 168 | 48 | 378 | 78 | 8 | 160 | 135 |
| 19 | 372 | 49 | 199 | 79 | 64 | 161 | 149 |
| 20 | 232 | 50 | 176 | 80 | 37 | 162 | 26 |
| 21 | 279 | 51 | 277 | 81 | 18 | 163 | 384 |
| 22 | 375 | 52 | 341 | 82 | 138 | 164 | 407 |
| 23 | 197 | 53 | 376 | 83 | 5 | 165 | 389 |
| 24 | 202 | 54 | 272 | 84 | 32 | 166 | 392 |
| 25 | 178 | 55 | 245 | 85 | 20 | 167 | 410 |
| 26 | 180 | 56 | 292 | 86 | 23 | 168 | 386 |
| 27 | 165 | 57 | 228 | 87 | 16 | 169 | 408 |
| 28 | 370 | 58 | 295 | 88 | 88 | | |
| 29 | 192 | 59 | 231 | 89 | 120 | | |

TABLE 6.2

| No. | ID | ID | No. | ID | ID |
|---|---|---|---|---|---|
| 102 | 345 | 379 | 126 | 348 | 268 |
| 103 | 278 | 262 | 127 | 252 | 204 |
| 104 | 249 | 289 | 170 | 118 | 115 |
| 105 | 195 | 275 | 171 | 153 | 70 |
| 106 | 177 | 198 | 172 | 86 | 129 |
| 107 | 342 | 225 | 173 | 67 | 41 |
| 108 | 281 | 169 | 174 | 11 | 65 |
| 109 | 246 | 339 | 175 | 150 | 38 |
| 110 | 377 | 347 | 176 | 113 | 155 |
| 111 | 227 | 294 | 177 | 121 | 134 |
| 112 | 291 | 326 | 178 | 131 | 73 |
| 113 | 171 | 230 | 179 | 35 | 9 |
| 114 | 273 | 251 | 180 | 89 | 33 |
| 115 | 182 | 201 | 181 | 43 | 6 |
| 116 | 374 | 166 | 182 | 17 | 91 |
| 117 | 337 | 265 | 183 | 75 | 123 |
| 118 | 203 | 251 | 184 | 22 | 137 |
| 119 | 267 | 179 | 185 | 139 | 19 |
| 120 | 185 | 297 | 186 | 156 | 12 |
| 121 | 369 | 371 | 187 | 124 | 44 |
| 122 | 299 | 283 | 188 | 92 | 76 |
| 123 | 235 | 233 | 189 | 409 | 411 |
| 124 | 331 | 329 | 190 | 406 | 385 |

TABLE 6.2-continued

| No. | ID | ID | No. | ID | ID |
|---|---|---|---|---|---|
| 125 | 380 | 172 | 191 | 387 | 390 |

What is claimed is:

1. A method of recording digital video data and digital audio data on a recording medium, each of the digital video and audio data being composed of a plurality of data words each consisting of a first specific number of bits, said method comprising the steps of:

converting the plurality of data words in each of the digital video and audio data to a plurality of code words each consisting of a second specific number of bits larger than the first specific number of bits, respectively, and concatenating the plurality of code words converted from each of the digital video and audio data so as to obtain a continuous bit sequence satisfying a condition wherein a number of bits having a same binary value and occurring continuously is within a range of from 2 to 10;

adding a first synchronous pattern having a first specific bit pattern, which consists of a third specific number of bits and which fails to occur in said continuous bit sequence, to a beginning end of said continuous bit sequence obtained from the digital video data and a second synchronous pattern having a second specific bit pattern, which consists of the third specific number of bits and which fails to occur in said continuous bit sequence, to a beginning end of said continuous bit sequence obtained from the digital audio data, said first specific bit pattern of said first synchronous pattern being different from said second specific bit pattern of said second synchronous pattern; and recording each of said continuous bit sequences added to said first synchronous pattern and said continuous bit sequences added to said second synchronous pattern on the recording medium;

wherein said first specific number of bits of each of said data words is 8, and said second specific number of bits of each of said code words is 12.

2. The method according to claim 1, wherein said second specific bit pattern of said second synchronous pattern is such a pattern that all bits of said first specific bit pattern of said first synchronous pattern are inverted.

3. A method of recording digital video data and digital audio data on a recording medium, each of the digital video and audio data being composed of a plurality of data words each consisting of a first specific number of bits, said method comprising the steps of:

converting the plurality of data words in each of the digital video and audio data to a plurality of code words each consisting of a second specific number of bits larger than the first specific number of bits, respectively, and concatenating the plurality of code words converted from each of the digital video and audio data so as to obtain a continuous bit sequence satisfying a condition wherein a number of bits having a same binary value and occurring continuously is within a range of from 2 to 10;

adding a first synchronous pattern having a first specific bit pattern, which consists of a third specific number of bits and which fails to occur in said continuous bit sequence, to a beginning end of said continuous bit sequence obtained from the digital video data and a second synchronous pattern having a second specific bit pattern, which consists of the third specific number of bits and which fails to occur in said continuous bit sequence, to a beginning end of said continuous bit sequence obtained from the digital audio data, first specific bit pattern of said first synchronous pattern being different from said second specific bit pattern of said second synchronous pattern; and recording each of said continuous bit sequences added to said first synchronous pattern and said continuous bit sequences added to said second synchronous pattern on the recording medium;

wherein one of said first specific bit pattern of said first synchronous pattern and said second specific bit pattern of said second synchronous pattern is '1111100111111111110011111' and the other of said first and second specific bit patterns is '0000011000000000001100000'.

4. A method of recording digital video data and digital audio data on a recording medium, each of the digital video and audio data being composed of a plurality of data words each consisting of a first specific number of bits, said method comprising the steps of:

converting the plurality of data words in each of the digital video and audio data to a plurality of code words each consisting of a second specific number of bits larger than the first specific number of bits, respectively, and concatenating the plurality of code words converted from each of the digital video and audio data so as to obtain a continuous bit sequence satisfying a condition wherein a number of bits having a safe binary value and occurring continuously is within a range of from 2 to 10;

inserting one or more continuous bits of binary value '1' and one or more continuous bits of binary value '0' into said continuous bit sequence alternately at predetermined intervals while keeping the condition that the number of bits having a same binary value and occurring continuously is within the range of from 2 to 10:

adding a first synchronous pattern having a first specific bit pattern, which consists of a third specific number of bits and which fails to occur in said continuous bit sequence, to a beginning end of said continuous bit sequence obtained from the digital video data and a second synchronous pattern having a second specific bit pattern, which consists of the third specific number of bits and which fails to occur in said continuous bit sequence, to a beginning end of said continuous bit sequence obtained from the digital audio data, said first specific bit pattern of said first synchronous pattern being different from said second specific bit pattern of said second synchronous pattern; and recording each of said continuous bit sequences added to said first synchronous pattern and said continuous bit sequences added to said second synchronous pattern on the recording medium;

wherein said first specific number of bits of each of said data words is 8, and said second specific number of bits of each of said code words is 12.

5. The method according to claim 4, wherein said second specific bit pattern of said second synchronous pattern is such a pattern that all bits of said first specific bit pattern of said first synchronous pattern are inverted.

6. A method of recording digital video data and digital audio data on a recording medium, each of the digital video and audio data being composed of a plurality of data words each consisting of a first specific number of bits, said method comprising the steps of:

converting the plurality of data words in each of the digital video and audio data to a plurality of code words each consisting of a second specific number of bits larger than the first specific number of bits, respectively, and concatenating the plurality of code words converted from each of the digital video and audio data so as to obtain a continuous bit sequence satisfying a condition wherein a number of bits having a same binary value and occurring continuously is within a range of from 2 to 10;

inserting one or more continuous bits of binary value '1' and one or more continuous bits of binary value '0' into said continuous bit sequence alternately at predetermined intervals while keeping the condition that the number of bits having a same binary value and occurring continuously is within the range of from 2 to 10;

adding a first synchronous pattern having a first specific bit pattern, which consists of a third specific number of bits and which fails to occur in said continuous bit sequence, to a beginning end of said continuous bit sequence obtained from the digital video data and a second synchronous pattern having a second specific bit pattern, which consists of the third specific number of bits and which fails to occur in said continuous bit sequence, to a beginning end of said continuous bit sequence obtained from the digital audio data, said first specific bit pattern of said first synchronous pattern being different from said second specific bit pattern of said second synchronous pattern; and recording each of said continuous bit sequences added to said first synchronous pattern and said continuous bit sequences added said second synchronous pattern on the recording medium;

wherein one of said first specific bit pattern of said first synchronous pattern and said second specific pattern of said second synchronous pattern is '1111100111111111110011111' and the other of said first and second specific bit patterns is '0000011000000000001100000'.

* * * * *